United States Patent Office 2,862,023
Patented Nov. 25, 1958

2,862,023

ADDUCTS OF ALKYL ACRYLATES AND POLYCHLOROMETHANES

Joseph E. Fields, Dayton, Ohio, assignor to Monsanto Chemical Company, St. Louis, Mo., a corporation of Delaware No Drawing. Application December 9, 1954
Serial No. 474,280

5 Claims. (Cl. 260—485)

The present invention relates to addition products and more particularly provides new and valuable adducts of butyl or amyl acrylate and certain polychloromethanes.

The new adducts are prepared by the free-radical-catalyzed reaction of the acrylate with the chloromethanes substantially according to the scheme:

in which X is selected from the class consisting of hydrogen and chlorine and in which not more than one X is hydrogen, R is selected from the class consisting of alkyl radicals of 4 and 5 carbon atoms and $n$ is a number of from 7 to 117.

Polychloromethanes suitable for the present purpose are, carbon tetrachloride and chloroform. Useful alkyl acrylates are n-butyl, isobutyl, tert-butyl, n-amyl, isoamyl and tert-amyl acrylates. A mixture of a butyl and an amyl acrylate or mixtures of the various isomeric butyl acrylates or of the isomeric amyl acrylates may be used.

The present chloromethane-butyl or amyl acrylate adducts have a molecular weight of from about 1,000 to 15,000. They are stable, viscous liquids which may be employed for a variety of commercial and industrial purposes. They are advantageously employed as substantially non-volatile plasticizers for vinyl chloride polymers such as polyvinyl chloride, vinyl chloride-vinyl acetate copolymers, etc.

The present adducts are readily obtainable by contacting carbon tetrachloride or chloroform with the acrylate at ordinary or increased temperatures in the presence of a free-radical-liberating agent as catalyst until formation of adducts having the desired viscosity characteristics has taken place. The reaction may be effected by mixing together the halomethane, ester and catalyst and maintaining the resulting mixture, advantageously with agitation, at a temperature which permits steady decomposition of the catalyst and consequent steady liberation of chloromethyl free-radicals. Or, if desired, the ester may be added gradually, e. g., dropwise, to the chloromethane, while constantly maintaining an optimum quantity of active catalyst in the reaction zone, which zone is preferably kept at a temperature conducive to the formation of free-radicals. Depending upon the nature of the individual reactants and catalyst and the properties desired in the final product, increased temperatures, e. g., temperatures of from above room temperature to about 125° C. may be generally employed. The reaction time may vary from, say, several hours to several days. Substantially equimolar quantities of the halomethane and the ester may be used; however, for the production, in good yields, of adducts having an average molecular weight of from 1,000 to 15,000, an excess of the halomethane is preferred. An excess of the ester is not recommended. Variation of catalyst quantity has been found to have a definite effect on the nature of the adduct. While catalyst quantities of up to 10% based on the weight of the ester may be used, I have found that generally a catalyst range of from 0.1% to 5% is preferable. The use of the greater proportions of catalyst within this range tends to favor formation of the lower molecular-weight adducts, and the use of lower quantities of catalyst tends to favor formation of the high molecular-weight adducts, i. e., adducts having a molecular weight of from, say, 5,000 to 7,000. The average molecular weight of the adducts is also influenced by other variables, e. g., ratio of the ester to the chloromethane, temperature, etc.

Formation of the present adducts probably proceeds through a chain mechanism, with termination of the chain at an early stage, i. e., at a point at which no more than 117 moles of the ester have added to one mole of the chloroform or carbon tetrachloride. Depending upon the nature and the quantity of the reactants and of the free-radical-liberating agent, as well as upon the reaction conditions, chain propagation may be terminated at various stages to yield products in which from 7 to 117 moles of the ester have added to one mole of chloroform or carbon tetrachloride.

An extraneous, inert solvent or diluent, e. g., benzene or hexane may be employed, either to serve as catalyst solvent, to mitigate reaction heat, or to dilute the concentration of the ester in the reaction mixture. The use of such a solvent or diluent, however, is generally of little economic advantage.

Free-radical-liberating agents which may be employed in promoting addition of the present acrylates to the polychloromethanes are compounds which will decompose to give free radicals. Such compounds include peroxygen-type catalysts, for example, acyl peroxides such as acetyl, benzoyl, lauroyl, or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrozine; organometallic compounds such as tetraethyl lead, etc. For convenience, the peroxygen-type catalysts will be hereinafter referred to as peroxidic compounds. Only catalytic quantities of the free-radical-liberating agent need be employed in promoting the addition reaction. Ultra-violet light may be employed with the catalyst or as the sole catalytic agent.

The invention is further illustrated, but not limited, by the following examples:

*Example 1*

This example shows the preparation of various adducts of butyl or amyl acrylate and chloroform or carbon tetrachloride. The following procedure was used:

The alkyl acrylate was mixed with the chloroform or carbon tetrachloride and the catalyst in the proportions shown below, and bottles of the respective mixtures were maintained on a rotating rack at a temperature of from 90–95° C. for 48 hours. At the end of that time any unreacted material was removed by distilling through a 10" Vigreux column. The residues were halomethane-alkyl acrylate adducts having the average molecular weights given below, as based on halogen content of the adducts. The following results were obtained:

I. From 2 M Bu acrylate, 6.5 g. $Bz_2O_2$, 10 M $CCl_4$; 510 g. adducts, 3.58% Cl, M. W. 3950

II. From 2 M Bu acrylate, 7.5 cc. of 75% cumene hydroperoxide, 10 M $CCl_4$; 220 g. adducts, 2.13% Cl, M. W. 6650

III. From .3 M Bu acrylate, .6 M $CCl_4$, .872 g. $Bz_2O_2$; 37.1 g. adducts, 2.65% Cl, M. W. 5350

IV. From .3 M Bu acrylate, .9 M $CHCl_3$, 1.94 g. cumene hydroperoxide; 39.2 g. adducts, 1.59% Cl, M. W. 6690

V. From 30 g. Bu acrylate, 154 g. CCl₄, 1.5 g. Bz₂O₂; 32 g. adducts, 3.98% Cl, M. W. 3560

VI. From 2 M Bu acrylate, 10 M CHCl₃, 6.5 g. Bz₂O₂; 505 g. adducts, 2.08% Cl, M. W. 5130

VII. From 8 M Bu acrylate, 40 M CHCl₃, 20.5 g. Bz₂O₂; 982 g. adducts, M. W. 5330

VIII. From .23 M Bu acrylate, .46 M CHCl₃, 40 cc. benzene, 1% Bz₂O₂; 31 g. adducts, .79% Cl; M. W. 13,450

IX. From 30 g. amyl acrylate, 119 g. CHCl₃, .6 g. Bz₂O₂; 28 g. adducts, M. W. 5700

X. From[1] .211 M Am acrylate, 1.5 g. Bz₂O₂, 1 M CCl₄; 31 g. adducts, 4.6% Cl, M. W. 3100

XI. From .211 M Am acrylate, .6 g. Bz₂O₂, 1 M CCl₄; 30.3 g. adducts, 3.12% Cl, M. W. 4550

XII. From 3 M Bu acrylate, .9 M CHCl₃, 5% by weight Bz₂O₂; 38 g. adducts, 7.03% Cl, M. W. 1513

Example 2

This example shows the preparation of a butyl acrylate-carbon tetrachloride adduct by gradual addition of the ester to the halide. 1538 g. (10 moles) of carbon tetrachloride and 5 cc. of a solution of 6.41 g. benzoyl peroxide in 85 cc. of carbon tetrachloride were placed in a flask equipped with a reflux condenser. To this there was then added dropwise, during a period of 4 hours and at refluxing temperature, 128.2 g. (1 mole) of butyl acrylate while adding the remainder of the benzoyl peroxide solution to the reaction mixture at 15 minute intervals. After all of the ester and the catalyst solution had been added, the whole was refluxed (77.5° C.) for 2 hours. The unreacted carbon tetrachloride was then stripped off to yield as residue 130 g. of the viscous, yellowish amber adduct, analyzing 3.86% chlorine and having a molecular weight of 3680.

Example 3

A mixture consisting of 461 g. (3.6 moles) of n-butyl acrylate, 1215 g. (10.18 moles) of chloroform and about 23 g. of benzoyl peroxide was placed in a bottle; and the bottle was sealed and placed on a rotating rack (43 R. P. M.) which was then maintained in an air oven for 68 hours at 95° C. At the end of that time unreacted chloroform and monomer was removed from the reaction mixture by distillation and there was obtained as residue 432 g. of the viscous butyl acrylate-chloroform adduct, analyzing 3.27% C, 8.68% H and 3.89% Cl. The molecular weight of this adduct, based on the chlorine content was 3253.

Example 4

The butyl acrylate-chloroform adduct of Example 3 was evaluated for use as an extending plasticizer with dioctyl phthalate in VYNW vinyl chloride-vinyl acetate copolymer, employing the following procedure:

A mixture consisting of 150 parts by weight of said copolymer, 50 parts by weight of dioctyl phthalate, and 50 parts by weight of the adduct of Example 3 was worked on a rolling mill to a homogeneous blend. A molded test specimen of the resulting milled product was tested for volatility characteristics by maintaining the specimen at a temperature of 105° C. for a time of 24 hours. At the end of this time the sample was allowed to cool and then weighed. There was thus determined a 2.16% loss in the weight of the product. A similarly blended and molded test specimen of the same vinyl chloride polymer plasticized only with dioctyl phthalate (150 parts VYNW,

[1] Reaction time 4 days instead of 48 hours.

100 parts dioctyl phthalate) gave a volatility value of 3.96% by the same testing procedure.

The present adducts can also be employed advantageously as the sole plasticizers with vinyl chloride-vinyl acetate copolymers or with copolymers of vinyl chloride and other monomers, e. g., vinylidene chloride. Adducts of butyl or amyl acrylate with chloroform or carbon tetrachloride prepared as herein described are generally useful as plasticizers or plasticizer extenders with resinous compositions comprising a copolymer of at least 70 percent by weight of vinyl chloride and 30 percent by weight of an unsaturated monomer copolymerizable therewith.

While the present acrylate adducts are very advantageously used as plasticizers for vinyl chloride resins, they may also be employed for a variety of other industrial purposes, e. g., as plasticizers for other synthetic resins and plastics, as heat-transfer media, dielectric fluids, lubricant additives, etc.

This application is a continuation-in-part of my application, Serial No. 327,931, filed December 24, 1952, now abandoned, which application Serial No. 327,931 was a continuation-in-part of my application Serial No. 192,335, filed October 26, 1950, and also now abandoned.

What I claim is:

1. Adducts of an alkyl acrylate and a polyhalomethane having the formula

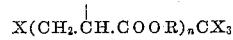

in which X is selected from the class consisting of hydrogen and chlorine and in which not more than one X is hydrogen, R is selected from the class consisting of alkyl radicals of 4 and 5 carbon atoms, and n is a number of from 7 to 117.

2. Adducts of carbon tetrachloride and butyl acrylate having the formula

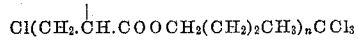

in which n is a number of from 7 to 117.

3. Adducts of carbon tetrachloride and amyl acrylate having the formula

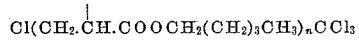

in which n is a number of from 7 to 117.

4. Adducts of chloroform and butyl acrylate having the formula

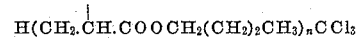

in which n is a number of from 7 to 117.

5. Adducts of chloroform and amyl acrylate having the formula

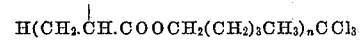

in which n is a number of from 7 to 117.

References Cited in the file of this patent

UNITED STATES PATENTS

| | | |
|---|---|---|
| 2,468,208 | Kharasch | Apr. 26, 1949 |
| 2,515,306 | Ladd et al. | July 18, 1950 |
| 2,568,859 | Ladd et al. | Sept. 25, 1951 |

OTHER REFERENCES

Ali et al.: Abstracts 116th Meeting Am. Chem. Soc. (September 18–23, 1949), p. 24N.

Ali et al.: Ind. Eng. Chem. 42 (1950), pp. 484–8.

Riddle: "Monomeric Acrylic Esters" (1954), pp. 57–8.